(12) United States Patent
Gelbman

(10) Patent No.: US 8,069,031 B2
(45) Date of Patent: Nov. 29, 2011

(54) MULTI-LINGUAL OUTPUT DEVICE

(76) Inventor: Lawrence Stephen Gelbman, Sherman Oaks, CA (US)

( * ) Notice: Subject to any disclaimer, the term of this patent is extended or adjusted under 35 U.S.C. 154(b) by 919 days.

(21) Appl. No.: 12/018,186

(22) Filed: Jan. 22, 2008

(65) Prior Publication Data
US 2008/0300880 A1    Dec. 4, 2008

Related U.S. Application Data

(60) Provisional application No. 60/933,005, filed on Jun. 4, 2007.

(51) Int. Cl.
*G06F 17/28* (2006.01)

(52) U.S. Cl. .................. 704/3; 704/2; 704/9; 704/270; 704/275; 715/16; 715/18; 715/21; 715/24

(58) Field of Classification Search .................. 704/2–3, 704/9, 270, 275; 705/16, 18, 21, 24
See application file for complete search history.

(56) References Cited

U.S. PATENT DOCUMENTS

| | | | | |
|---|---|---|---|---|
| 5,351,189 A | * | 9/1994 | Doi et al. | 704/3 |
| 5,351,995 A | * | 10/1994 | Booker | 283/117 |
| 6,047,252 A | * | 4/2000 | Kumano et al. | 704/2 |
| 6,061,646 A | * | 5/2000 | Martino et al. | 704/3 |
| 6,845,364 B1 | * | 1/2005 | Pool et al. | 705/26.35 |
| 2005/0049922 A1 | * | 3/2005 | Kargman | 705/15 |
| 2005/0216888 A1 | * | 9/2005 | Drummond et al. | 717/113 |
| 2006/0157560 A1 | * | 7/2006 | Skor et al. | 235/381 |
| 2009/0089172 A1 | * | 4/2009 | Quinlan et al. | 705/17 |

* cited by examiner

*Primary Examiner* — Richemond Dorvil
*Assistant Examiner* — Greg Borsetti
(74) *Attorney, Agent, or Firm* — James A. Italia; Italia IP

(57) ABSTRACT

This application discloses A multi-lingual output device for output of transactional information for a given customer, the device that includes a data base for determining what transaction information needs to be outputted, the local language in which the information is to be outputted, and the preferred language of the customer in which the information is to be outputted; and, a local transaction subsystem in communication with said database, wherein said local transaction sub system includes input device receiving means for accepting an input device and output generating means for generating a signal to an output device.

17 Claims, 2 Drawing Sheets

MULTI-LINGUAL OUTPUT DEVICE

CROSS-REFERENCE TO RELATED APPLICATION

This application claims the benefit of the filing date under 35 USC 119(e) of the filing date of U.S. Provisional Application Ser. No. 60/933,005, filed Jun. 4, 2007, the contents of which are hereby incorporated by reference.

BACKGROUND OF INVENTION

This application relates generally to a device for providing an output of text such that it is presented in at least two languages. More specifically, this application relates to a device whereby text is provided to an output device such as a monitor or a printer such that the text is presented in both the language of the country of origin and the preferred language of the user.

SUMMARY

Evidence of commercial transactions such as invoices, receipts (credit card, debit card, automatic teller machines, etc.), tickets, coupons and any other such printed devices are often only printed on one side of the paper and always in the local language in which the paper and/or electronic commerce is being conducted. This has limitations because not everyone within a country speaks or understands the language in which the electronic commerce is being conducted. This becomes more prevalent in areas where there is a large proportion of international business travel, tourism, immigration, and or the concentration of non-native speaking people within local communities.

To that end, there is a need for a device that allows such evidence of commercial transactions (printed devices) to be printed in both the local language in which transaction takes place and the language preferred by the user/customer. This would help the customer by having a printed device that is easy to understand and that could also be used to question the vendor should there be some form of discrepancy.

Further, it would also be helpful if the text evidencing or leading to a commercial transaction could be displayed on a monitor such as a computer monitor, automatic teller machine, ticket kiosk, or any other device that utilizes a display to convey information in both the local language and user preferred language. As used herein, such information displayed on a monitor is referred to as a "displayed device." Thus, information or text relating to a commercial transaction can therefore be outputted to a printer to produce a printed device or monitor to produce a displayed device.

In particular, this application discloses a multi-lingual output device for output of transactional information for a given customer, the device comprising: a data base for determining what transaction information needs to be outputted, the local language in which the information is to be outputted, and the preferred language of the customer in which the information is to be outputted; and, a local transaction subsystem in communication with said database, wherein said local transaction sub system includes input device receiving means for accepting an input device and output generating means for generating a signal to an output device.

This application also discloses a multi-lingual output device for output of transactional information for a given customer, the device comprising: a data base for determining what transaction information needs to be outputted, the local language in which the information is to be outputted, and the preferred language of the customer in which the information is to be outputted; a local transaction subsystem in communication with said database, wherein said local transaction sub system includes input device receiving means for accepting an input device and output generating means for generating a signal to an output device; wherein the input device is selected from the group consisting of keyed or touch entry, magnetized card reader, voice recognition, and a wireless hand held device; and, wherein the output device is a printer to produce a printed device and wherein the printer prints the transactional information on opposite sides of the printed device such that the local language is on one side and the customer's preferred language is on the opposite side.

This application further discloses a multi-lingual output device for output of transactional information for a given customer, the device comprising: a data base for determining what transaction information needs to be outputted, the local language in which the information is to be outputted, and the preferred language of the customer in which the information is to be outputted; a local transaction subsystem in communication with said database, wherein said local transaction sub system includes input device receiving means for accepting an input device and output generating means for generating a signal to an output device; wherein the input device is selected from the group consisting of keyed or touch entry, magnetized card reader, voice recognition, and a wireless hand held device; wherein the output device is a printer to produce a printed device and wherein the printer prints the transactional information on the same side of the printed device; and, wherein the output device also includes a monitor to generate a displayed device.

This application further discloses as system for outputting transactional information relating from a transaction in multiple languages, the system comprising: a plurality of devices connected to one or more networked systems, of which at least one of said devices on one of said networked systems is capable of outputting in multiple languages; wherein one of said networked systems contains one or more databases which are used singularly or collectively for determining the local language and the customer's preferred language; wherein said devices are in communication with said databases of said networks; wherein said devices include means in proximity to said customer for accepting information related to said transaction; and, wherein said device includes means in proximity to said customer for outputting said transactional information relating from said transaction in said languages.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
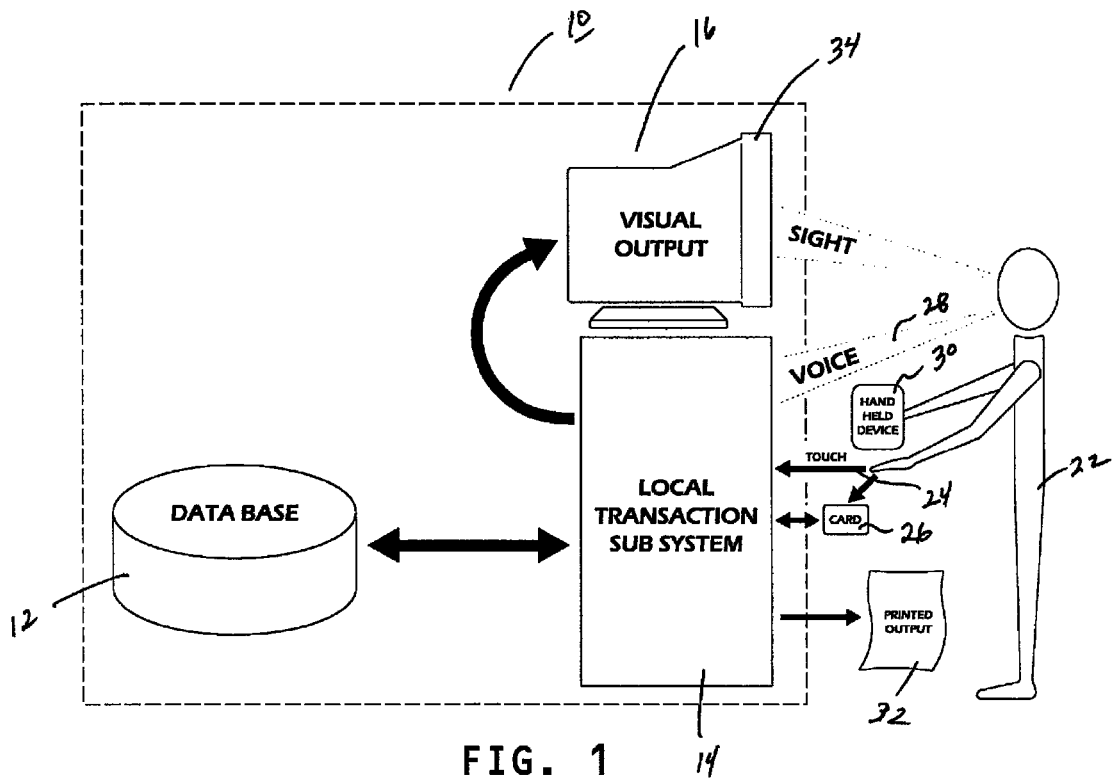
FIG. 1 is a schematic of the multi-lingual output device and method as disclosed herein.
Figure 2:
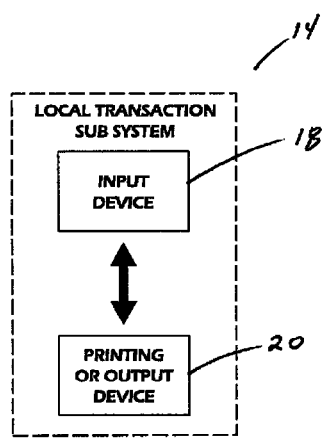
FIG. 2 is a schematic of a first embodiment of the local transactions subsystem as disclosed herein.
Figure 3:
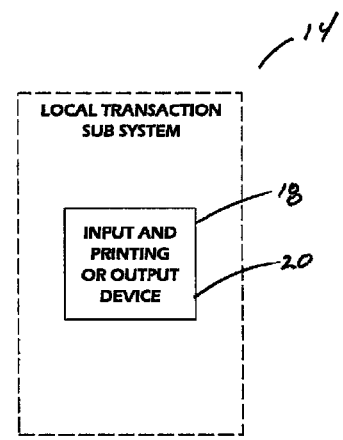
FIG. 3 is a schematic of a second embodiment of the local transactions subsystem as disclosed herein; and, FIG. 4 is a schematic of the various printed devices disclosed herein.

Referring to FIG. 1, a preferred embodiment is shown of a multi-lingual output device 10. As shown the device includes a database 12, a local transaction subsystem 14, and optionally, a visual output device 16. The local transaction subsystem 14 may be of two types as shown in FIGS. 2 and 3. In the first embodiment, the local transaction subsystem 14 includes an input device 18 in electronic communication with a separate printing or output device 20. The input device 18 may be any device used by an operator 22 to input information relating to a given transaction and may include: keyed or touch entry 24, magnetized card reader 26, voice recognition 28, and/or personal hand held device 30 in wireless connection with the device 10, etc. The printing or output device 20 is used to either generate a printed device 32 such as a receipt from a printer or a displayed device 34 such as on a monitor. In the second embodiment, the local transaction subsystem 14 includes the input device 18 and printing or output device 20 as one component 21 capable of the dual functions described above. The data base 12 includes storage means to retain certain aspects of information responsive to the input device 18 of the local transaction subsystem 14 and includes: 1) what transaction information needs to be printed out on the receipt/document as part of the printed device 32 or displayed device 34; 2) the local language in which documents are printed or displayed; and 3) the appropriate language the customer prefers.

Figure 4:
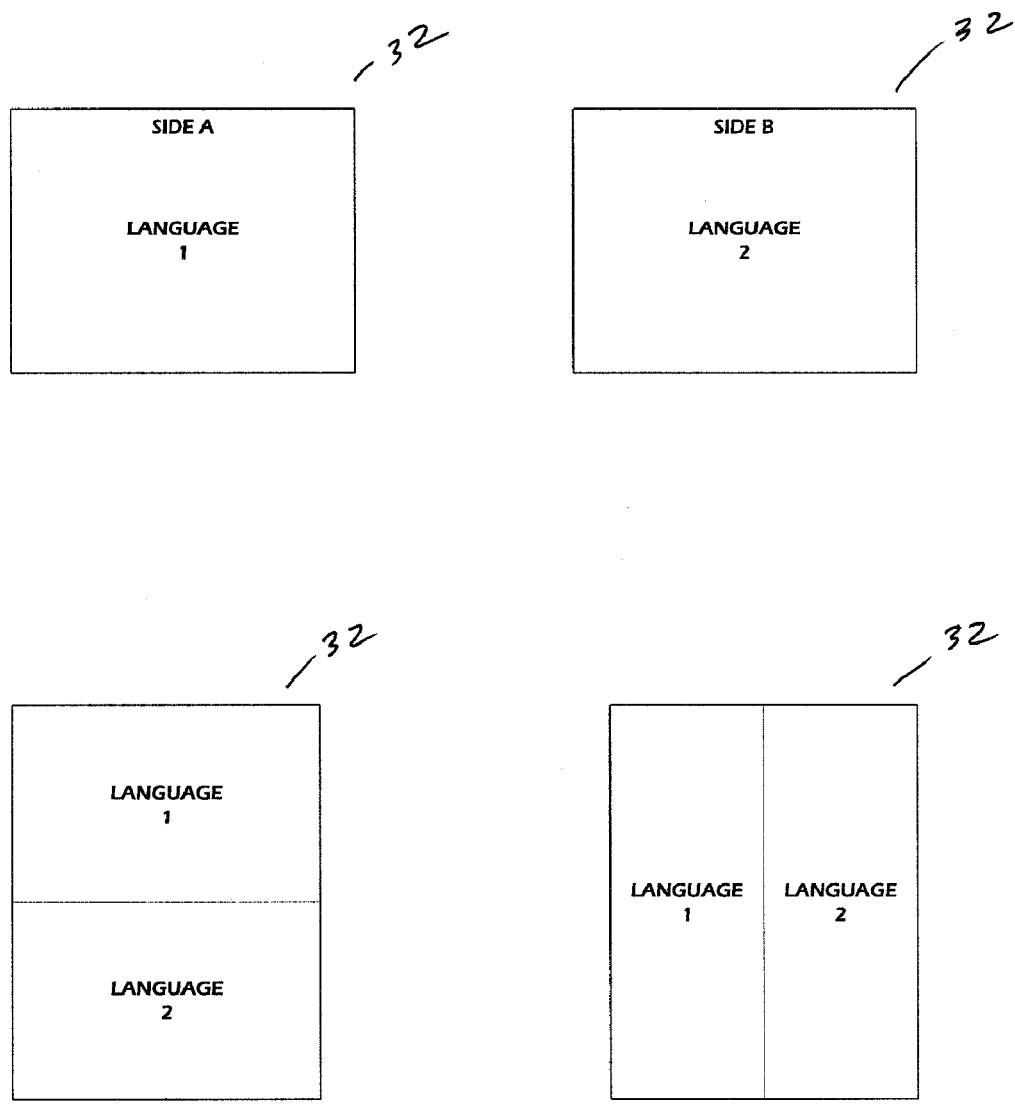

The device 10 then calls upon on a utility program/application which can reside anywhere within the device 10 to format the information into commands that are sent to the printer or monitor, which cause the printer to print out, or monitor to display, the transaction information in dual languages. As shown in FIG. 4, the printed device 32 can be of various forms such as on opposite sides, above and below, and side by side. In one embodiment, the printer is capable of generating the printed device 32 by printing the bi-lingual information on both sides of a receipt or transaction document, without having to remove and reinstall the receipt or transaction document. In another embodiment, the printed device 32 is generated by printing a first side of the document in one language and then reinserting the printed device 32 so to print the second language on the opposite side of the printed device 32. This printing may be achieved by either manually or automatically feeding the printed device 32 to the printer. The printing can be initiated and/or carried out via mechanical/physical contact or any type of wave or signal which could be electromagnetic, optical or acoustic in nature, such as but not limited to: radio signals, visible light waves, in-visible light waves sound waves, electric current, electric pulses, and voltages.

Validation, verification, or authorization of the device 10 is initiated by the input device 18 presented by the customer/operator for payment, initiation, or completion of the transaction. The device 10 then determines the customer's native/preferred language. The process of determining the customer's native/preferred language when the input device is a magnetized card 26 or personal handheld device 30 in wireless connection with the device 10 can be accomplished by a variety of mechanisms once the card 26 or wireless device 30 is presented to the device 10, including but not limited to: 1) checking to see if the country or region indicated within the data base 12 containing the customer's home billing address that is maintained by or for the entity that issued the card 26 or hand held device 30, is different from the location (region or country) where the transaction is physically occurring; or 2) searching within the customer's primary account record or data base 12 of the card 26 or hand held device 30 for a field, element, or other piece of data or indicator that indicates the customer's native/preferred language.

The process of determining the customer's native/preferred language when the input device 18 is a utilization of a keyed/touch 24 or voice entry 28 can be accomplished by the customer simply selecting the preferred language to print or display the transaction information in along with the language of the country of origin.

Regardless of the input device 18, the device 10 then determines: 1) what transaction information needs to be printed out on the receipt/document or displayed on a monitor; 2) the local language in which documents are printed or displayed; and 3) the appropriate language the customer prefers. The device 10 then prints the transaction information as part of a printed device 32 in the two languages (preferred and local), displays the two languages (preferred and local) on a display device 34 or displays the preferred language only on a display device 34, or produces a combination of a printed 32 and displayed device 34. If translation of the transaction information is utilized, the translation can occur within the device 10 as part of a software component or the device 10 can access a translation database via a secondary connection such as to the internet. It also contemplated that said device 10 or a plurality of devices 10 can be connected as part of a networked system for determining and providing the information as described above.

Further, it is contemplated that customers can have more than one preferred language. In these cases the information is printed or displayed in as many languages the customer has indicated, as available space permits. In the case where the customer has identified multiple preferred languages, the customer will have predefined the priority of printing the languages so the language with the highest priority is printed or displayed first. There may be other conditions set by the customer or determined at the time the transaction is initiated, which determines the priority in which languages are printed.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A multi-lingual output device for output of transactional information for a given customer, the device comprising:
   a data base for determining what transaction information needs to be outputted, the local language in which the information is to be outputted, and a plurality of preferred languages of the customer in which the information is to be outputted, and means for storing more than one customer language; and,
   a local transaction subsystem in communication with said database, wherein said local transaction subsystem includes input device receiving means for accepting an input device and output generating means for generating a signal to an output device, wherein the database further comprises means for storing more than one preferred customer language, the output device is a printer disposed to produce a printed device, and the input device is disposed to determine the customer's preferred language by the customer selecting the preferred language to print transaction information wherein the database includes information relating to the predefined priority of printing or displaying the preferred languages so that the language with the highest priority is printed or displayed first, and wherein the customer indicates a plurality of preferred languages, and wherein the priority in which the plurality of preferred languages are printed or displayed is set by the customer.

2. The device of claim 1 wherein the input device is selected from the group consisting of keyed or touch entry, magnetized card reader, voice recognition, and a wireless hand held device.

3. The device of claim 1 wherein the printer prints the transactional information on opposite sides of the printed device such that the local language is on one side and the customer's preferred language is on the opposite side.

4. The device of claim 1 wherein the printer prints the transactional information in the local language and the customer's preferred language on the same side of the printed device such that the languages are adjacent to each other.

5. The device of claim 1 wherein the printer prints the transactional information in the local language and the customer's preferred language on the same side of the printed device such that the languages are above and below each other.

6. The device of claim 1 wherein the output device is a monitor to generate a displayed device.

7. The device of claim 1 wherein the output device also includes a monitor to generate a displayed device.

8. The device of claim 1 wherein the local transaction subsystem comprises an input device in communication with a separate output device.

9. The device of claim 1 wherein the local transaction subsystem comprises an input device and output device as one unit for accomplishing the dual functions.

10. A multi-lingual output device for output of transactional information for a given customer, the device comprising:
   a data base for determining what transaction information needs to be outputted, the local language in which the information is to be outputted, and a plurality of preferred languages of the customer in which the information is to be outputted, and means for storing more than one customer language;
   a local transaction subsystem in communication with said database, wherein said local transaction sub system includes input device receiving means for accepting an input device and output generating means for generating a signal to an output device;
   wherein the input device is selected from the group consisting of keyed or touch entry, magnetized card reader, voice recognition, and a wireless hand held device; and,
   wherein the output device is a printer to produce a printed device and wherein the printer prints the transactional information on opposite sides of the printed device such that the local language is on one side and the customer's preferred language is on the opposite side, and further wherein the output device is a printer disposed to produce a printed device, and wherein the input device disposed to determine the customer's preferred language by the customer selecting the preferred language to print transaction information, and wherein the customer indicates a plurality of preferred languages, and wherein the priority in which the plurality of preferred languages are printed or displayed is set by the customer.

11. The device of claim 10 wherein the local transaction subsystem comprises an input device in communication with a separate output device.

12. The device of claim 10 wherein the local transaction subsystem comprises an input device and output device as one unit for accomplishing the dual functions.

13. A multi-lingual output device for output of transactional information for a given customer, the device comprising:
   a data base for determining what transaction information needs to be outputted, the local language in which the information is to be outputted, and a plurality of preferred languages of the customer in which the information is to be outputted;
   a local transaction subsystem in communication with said database, wherein said local transaction sub system includes input device receiving means for accepting an input device and output generating means for generating a signal to an output device;
   wherein the input device is selected from the group consisting of keyed or touch entry, magnetized card reader, voice recognition, and a wireless hand held device;
   wherein the output device is a printer to produce a printed device and wherein the printer prints the transactional information on the same side of the printed device;
   wherein the output device also includes a monitor to generate a displayed device, and further wherein the output device is a printer disposed to produce a printed device, and wherein the input device disposed to determine the customer's preferred language by the customer selecting the preferred language to print transaction information, and wherein the customer indicates a plurality of preferred languages, and wherein the priority in which the plurality of preferred languages are printed or displayed is set by the customer.

14. The device of claim 13 wherein the local transaction subsystem comprises an input device in communication with a separate output device.

15. The device of claim 13 wherein the local transaction subsystem comprises an input device and output device as one unit for accomplishing the dual functions.

16. A system for outputting transactional information relating from a transaction in multiple languages, the system comprising:
   a plurality of devices connected to one or more networked systems, of which at least one of said devices on one of said networked systems is capable of outputting in multiple languages;
   wherein one of said networked systems contains one or more databases which are used singularly or collectively for determining the local language and a plurality of the customer's preferred languages;
   wherein said devices are in communication with said databases of said networks;
   wherein said devices include means in proximity to said customer for accepting information related to said transaction;
   wherein said device includes means in proximity to said customer for outputting said transactional information relating from said transaction in said languages, and wherein the input device disposed to determine the customer's preferred language by the customer selecting the preferred language to output transaction information, and wherein the customer indicates a plurality of preferred languages, and wherein the priority in which the plurality of preferred languages are output is set by the customer.

17. The system of claim 16 wherein said databases, which are used singularly or collectively, to determine what transaction information needs to be outputted in the local language.

* * * * *